United States Patent
Powchowicz (10) Patent No.: US 11,461,224 B2
(45) Date of Patent: Oct. 4, 2022

(54) SYSTEM AND METHOD FOR REDUCING MEMORY FRAGMENTATION IN A DEVICE LACKING GRAPHICS MEMORY MANAGEMENT UNIT

(71) Applicant: ADVANCED DIGITAL BROADCAST SA, Bellevue (CH)

(72) Inventor: Tomasz Powchowicz, Zielona Gora (PL)

(73) Assignee: ADVANCED DIGITAL BROADCAST SA, Bellevue (CH)

( * ) Notice: Subject to any disclaimer, the term of this patent is extended or adjusted under 35 U.S.C. 154(b) by 238 days.

(21) Appl. No.: 16/782,145

(22) Filed: Feb. 5, 2020

(65) Prior Publication Data

US 2020/0250079 A1 Aug. 6, 2020

(30) Foreign Application Priority Data

Feb. 6, 2019 (EP) .................................... 19155702

(51) Int. Cl.
*G06F 12/02* (2006.01)
*G06T 1/60* (2006.01)

(52) U.S. Cl.
CPC .............. *G06F 12/023* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 6,130,759 A | 10/2000 | Blair | |
| 9,201,781 B2* | 12/2015 | Asai | .................... G06F 12/0223 |
| 2008/0298723 A1* | 12/2008 | Hasegawa | ............... G06T 5/008 |
| | | | 382/305 |
| 2014/0184630 A1 | 7/2014 | Krig | |
| 2021/0042890 A1* | 2/2021 | Naidu | ....................... G06T 1/60 |

FOREIGN PATENT DOCUMENTS

JP H02257230 A 10/1990

* cited by examiner

*Primary Examiner* — Charles Rones
*Assistant Examiner* — Ryan Dare
(74) *Attorney, Agent, or Firm* — Mark M. Friedman (57) ABSTRACT

Method for reducing memory fragmentation characterized in that it the steps of: for each image in a source set of images (601) determining image size (602) in pixels and obtaining (603) a minimal total number of pixels for an aggregated surface by obtaining a sum of image sizes; factorizing (604) the sum of image sizes into a surface's width and height; allocating memory (702) for the surface (701); creating (703) a mapping between an image identifier and its location, width, height for each image associated with the surface; for each image, according to its offset in the surface, the two-dimensional space of the image is cast (704) to one dimension; knowing the casting formula between the one and two-dimensional spaces, copying each image to the surface (705).

8 Claims, 8 Drawing Sheets

| Image Identifier | Location, Image Width, Image Height |
|---|---|
| A | 0,620,95 |
| B | 58900,233,332 |
| C | 136256,259,214 |

SYSTEM AND METHOD FOR REDUCING MEMORY FRAGMENTATION IN A DEVICE LACKING GRAPHICS MEMORY MANAGEMENT UNIT

TECHNICAL FIELD

The present invention relates to a system and method for reducing memory fragmentation in a device lacking graphics memory management unit. In particular, the present invention relates to allocating memory space for graphical images so as to reduce fragmentation of said memory.

BACKGROUND OF THE INVENTION

A memory management unit (MMU), sometimes called paged memory management unit (PMMU), is a computer hardware unit having all memory references passed through itself, primarily performing the translation of virtual memory addresses to physical addresses. It is usually implemented as part of the central processing unit (CPU), but it also can be in the form of a separate integrated circuit (source: Wikipedia).

An MMU effectively performs virtual memory management, handling at the same time memory protection, cache control, bus arbitration and, in simpler computer architectures (especially 8-bit systems), bank switching.

Further, in computing, an input-output memory management unit (IOMMU) is a memory management unit (MMU) that connects a direct-memory-access-capable (DMA-capable) I/O bus to the main memory. Like a traditional MMU, which translates CPU-visible virtual addresses to physical addresses, the IOMMU maps device-visible virtual addresses (also called device addresses or I/O addresses in this context) to physical addresses. Some units also provide memory protection from faulty or malicious devices (source: Wikipedia).

In computer storage, fragmentation is a phenomenon in which storage space is used inefficiently, reducing capacity or performance and often both. The exact consequences of fragmentation depend on the specific system of storage allocation in use and the particular form of fragmentation. In many cases, fragmentation leads to storage space being "wasted", and in that case the term also refers to the wasted space itself.

Due to the rules governing memory allocation, more computer memory is sometimes allocated than is needed. When this happens, the excess memory goes to waste. In this scenario, the unusable memory is contained within an allocated region. This arrangement, termed fixed partitions, suffers from inefficient memory use—any process, no matter how small, occupies an entire partition. This waste is called internal fragmentation.

External fragmentation arises when free memory is separated into small blocks and is interspersed by allocated memory. It is a weakness of certain storage allocation algorithms, when they fail to order memory used by programs efficiently. The result is that, although free storage is available, it is effectively unusable because it is divided into pieces that are too small individually to satisfy the demands of the application. The term "external" refers to the fact that the unusable storage is outside the allocated regions (source: Wikipedia).

When MMU for managing graphics memory is not available in a system, the aspects related to memory fragmentation are present. Allocation of a large section of continuous physical addresses (e.g. size of a primary surface or back buffer) may not be possible, because some smaller allocations are placed over the memory. In such case, a size of free memory exceeds allocation request and it is available as a sum of smaller free chunks.

The simplest solution to this issue is providing a sufficient amount of free memory and a selection of an allocation method that produces internal fragmentation. Extending amount of free RAM could not be accepted in some systems due to the involved cost.

A more sophisticated method for resolving excessive fragmentation is applying a policy to allocate/deallocate memory is a specific order. Keeping order of allocations is hard to accept by design in cases when animations are used (e.g. when mixing an old and new state, the old state is unloaded after loading the new state, therefore two states exist in memory at the same time for a moment of animation).

Extending RAM is not an option for a platform already deployed. When adding a new feature to a system other methods of reducing fragmentation needs to be considered. The most common method to resolve a lack of continuous area in RAM is to terminate an application and then restart it. Some systems have an instant application termination as a design principle, so an application must store intermediate steps in persistent memory. A disadvantage of this solution is a need for restarting an application or a set of applications when an exception during allocation caused by fragmentation occurs. Resolving fragmentation is this way takes time and consumes energy.

Another way of dealing with this issue is to stop a system and run a cleaning task to relocate scattered allocations along memory into adjacent allocations placed one to another. This process has two serious disadvantages. The first one is an averagely longer time to clean up compared to the previous method because the process of defragmentation must relocate physical memory. The second one is extra energy needed to perform such operation, that could be essential when dealing with battery-operated apparatus.

Another approach is to combine small images (201, 202, 203) into an aggregated one (204). The aggregated surface (204) has a few benefits: faster loading and decompression time comparing to a set of small images decompressed separately, decreasing the number of small allocations. This approach has also drawbacks such as internal fragmentation if images are not in the same size. It is time-consuming to find an optimal placement of images. Also, adjacent rows of image data are not placed in adjacently in physical memory disturbing a process of copying data, because each row has to be copied separately.

It would be advantageous to allocate memory space, for graphical images, so as to reduce fragmentation of said memory.

A publication of U.S. Pat. No. 7,394,466, entitled "Method for memory allocation for images", discloses a method for memory allocation for images, when storing data describing an image in operating memory, wherein the image is divided into lines, and each line is described by a separate subset of data, from which at least one set of data is created, to which a free segment of operating memory is assigned. The creation of sets of data is performed until data describing the whole image is assigned to the sets of data, and when reading the image, consecutive lines are read from the operating memory, until the whole image is read.

The solution of '466 is applicable when memory is already fragmented and a large memory area needs to be allocated. Instead of cleaning up memory space (as described above) an image is split into lines (one line or a set of lines) and allocated as such image parts. In contrast the present solution aims at preventing or at least reducing memory fragmentation.

The aim of the development of the present invention is an improved and resources-efficient system and method for reducing memory fragmentation in a device lacking graphics memory management unit.

SUMMARY AND OBJECTS OF THE PRESENT INVENTION

An object of the present invention is a method for reducing memory fragmentation characterized in that it comprises the steps of: for each image in a source set of images determining image size in pixels and obtaining a minimal total number of pixels for an aggregated surface by obtaining a sum of image sizes; factorizing said sum of image sizes into a surface's width and height; allocating memory for said surface; creating a mapping between an image identifier and its location, width, height for each image associated with the surface; for each image, according to its offset in the surface, the two-dimensional space of the image is cast to one dimension according to the formula:

$$pi = yi*width + xi + location$$

where $i >= 0$ and $i <$ size of the image
where
(xi, yi) is a location of image's pixels in the two-dimensional space;
pi is position in image's one-dimensional space;
the location defines an offset of the image in the surface's one-dimensional space;
knowing the casting formula between said one and two-dimensional spaces, copying each image to the surface.

Preferably, if said factorizing step is impossible, incrementing the sum by 1 and re-executing the factorizing step for the increases sum until the factors (width, height) have been found. One of the known methods of integer factorization can be used.

Preferably, said factorizing is executed by applying a trial division method.

Preferably, a most balanced width and height are selected from the output of the factorizing step.

Preferably, the surface is further compressed to reduce its size.

Preferably, said source set of images is fitted into a plurality of surfaces.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

Lastly, the present invention relates to a system for reducing memory fragmentation characterized in that it comprises an Image Controller comprising: an Image Decoder configured to decode and decompress a surface comprising images into a Memory; an Image Mapper configured to return an image location, width, height from respective mappings associated with a given image identifier; and a Space Transformer configured to convert between a one-dimensional space and a two-dimensional space; wherein said Image Controller is configured to execute all steps of the method according to the present invention.

BRIEF DESCRIPTION OF THE DRAWINGS

These and other objects of the invention presented herein, are accomplished by providing a system and method for reducing memory fragmentation in a device lacking graphics memory management unit. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

Figure 2:
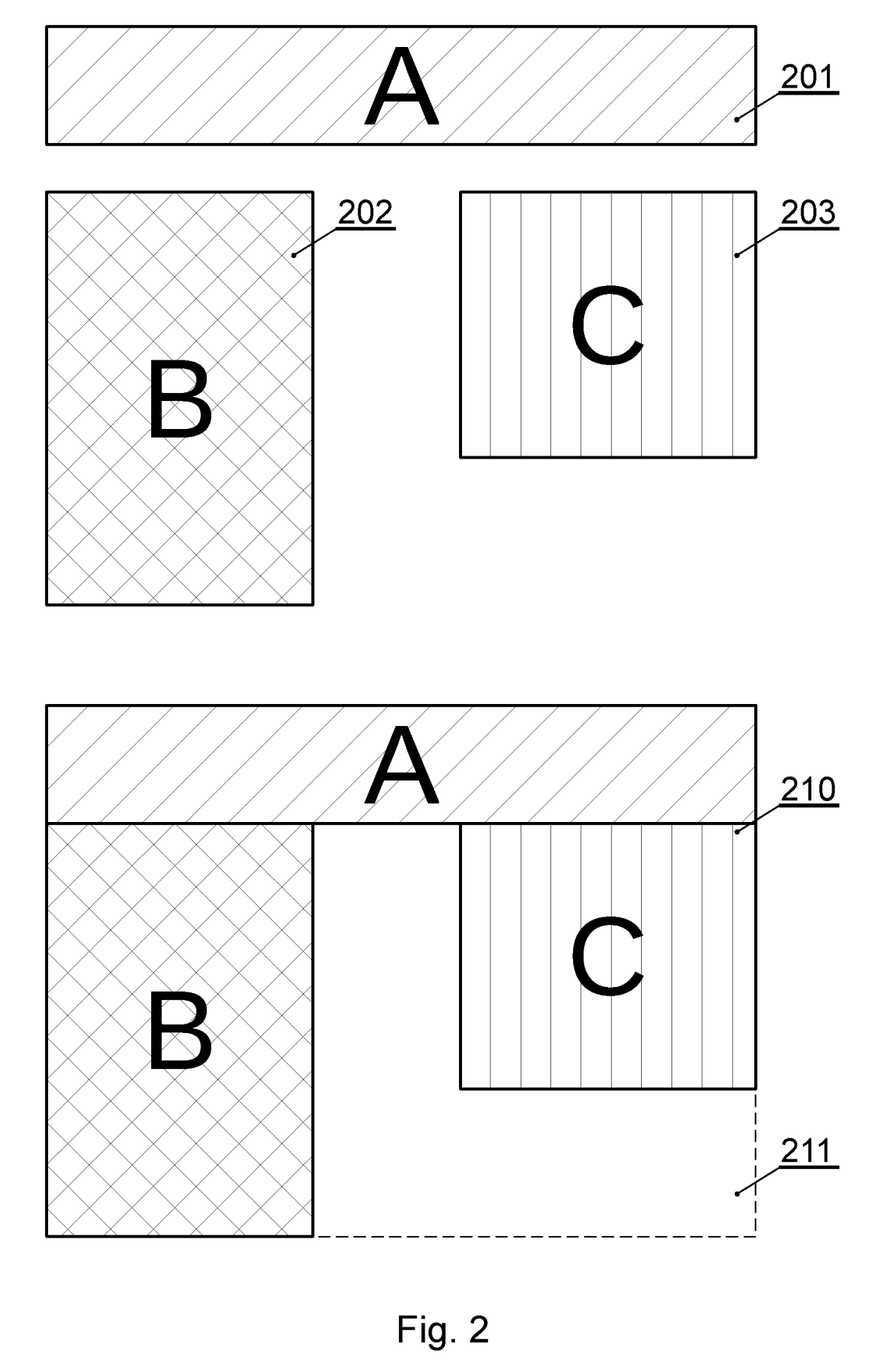
FIG. 2 depicts a method of packing images rectangles into two-dimensional space, which is known from prior art.
Figure 3A:
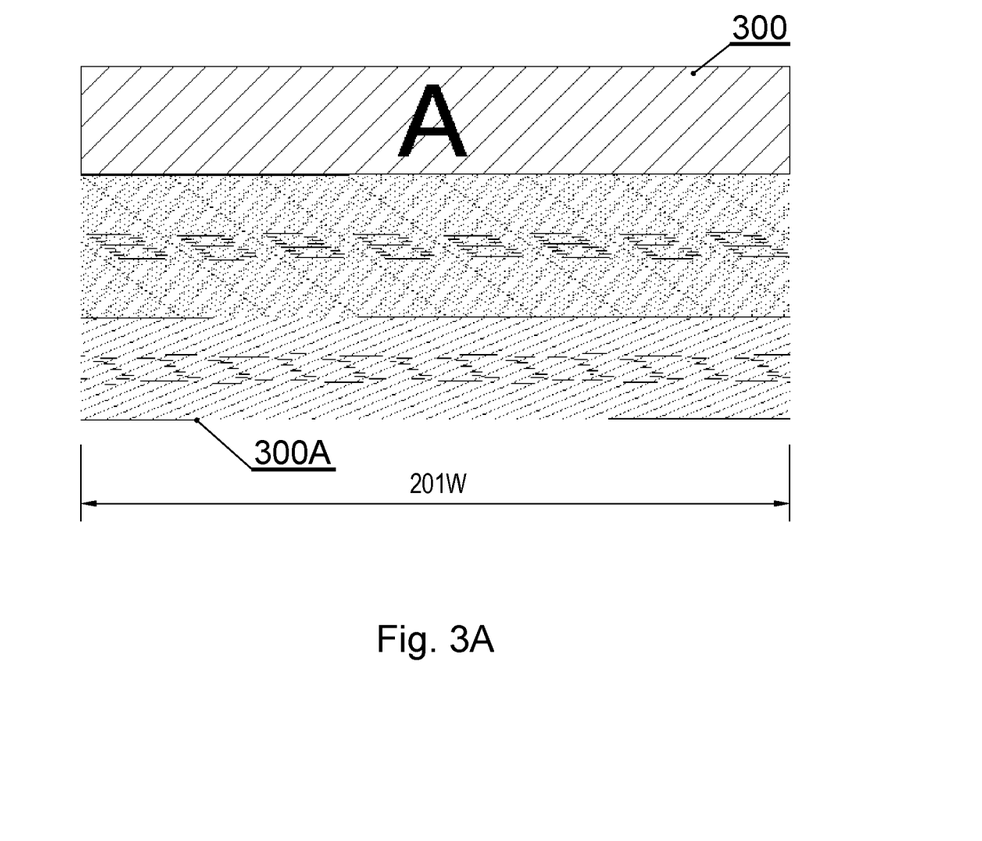
FIGS. 3A-B illustrate a method of packing image rectangles into one-dimensional space with different surface widths.
Figure 3B:
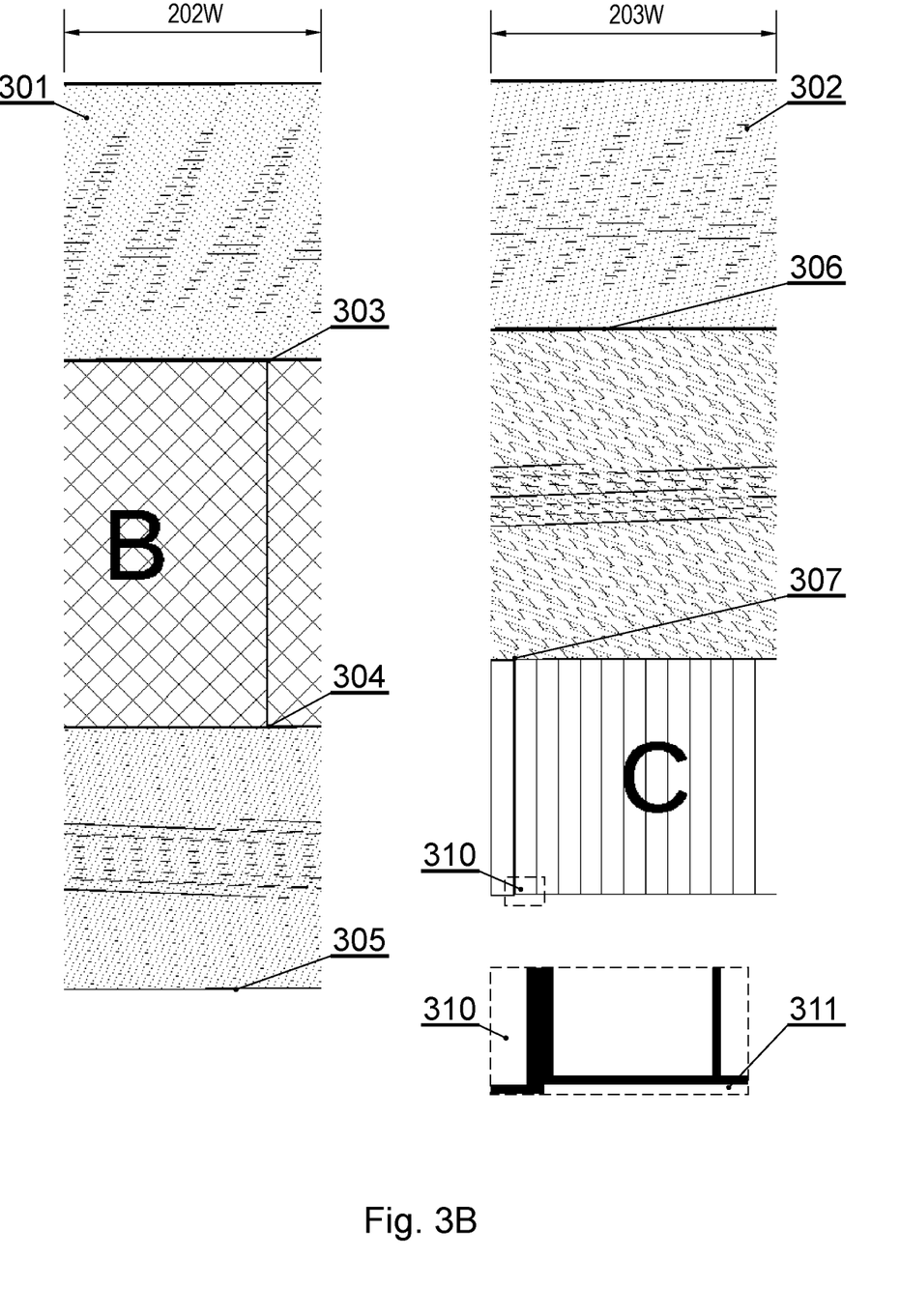

A basic concept of the Invention will now be described. The present invention focuses on decreasing internal fragmentation of a memory (211). It provides a method of composing images into a larger surface in that way the internal fragmentation is minimal. Said basic technical concept of the present invention is an introduction of a method of transforming two-dimensional images (x, y, width, height) into one dimensional space (location, size=image width*image height). The one dimensional space may be cast into two dimensions to provide compression of a surface (300, 301, 302). Some internal fragmentation can occur (311) when surface's width is not selected in term of minimization (311).

Figure 4A:
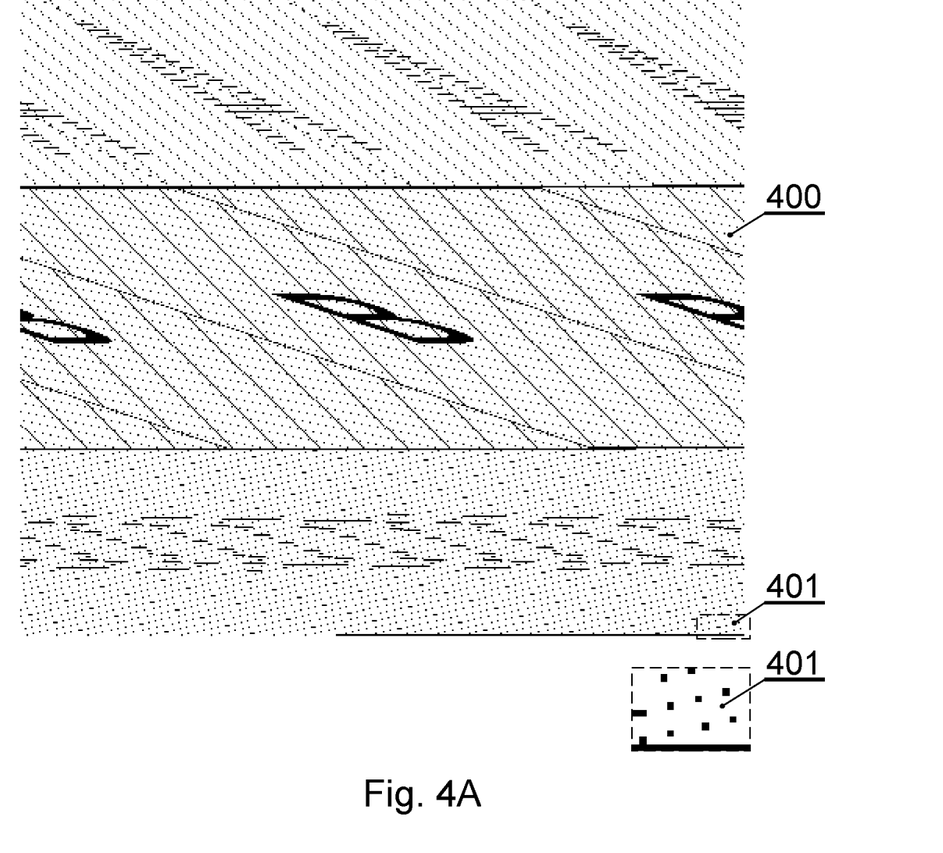
FIG. 4A presents a surface subjected to a linear transformation where the surface width is optimized and internal fragmentation does not occur.

The proposed solution minimizes the unused space—internal fragmentation (311) by adjusting a surface's width (401). A location map of associations between image identifiers and a location and size is generated during the process of concatenating images. An image position, width, height can be found in the aggregated surface by an image identifier. The process of preparation of an aggregated image is preferably executed before preparation of an application package or firmware.

Figure 1:
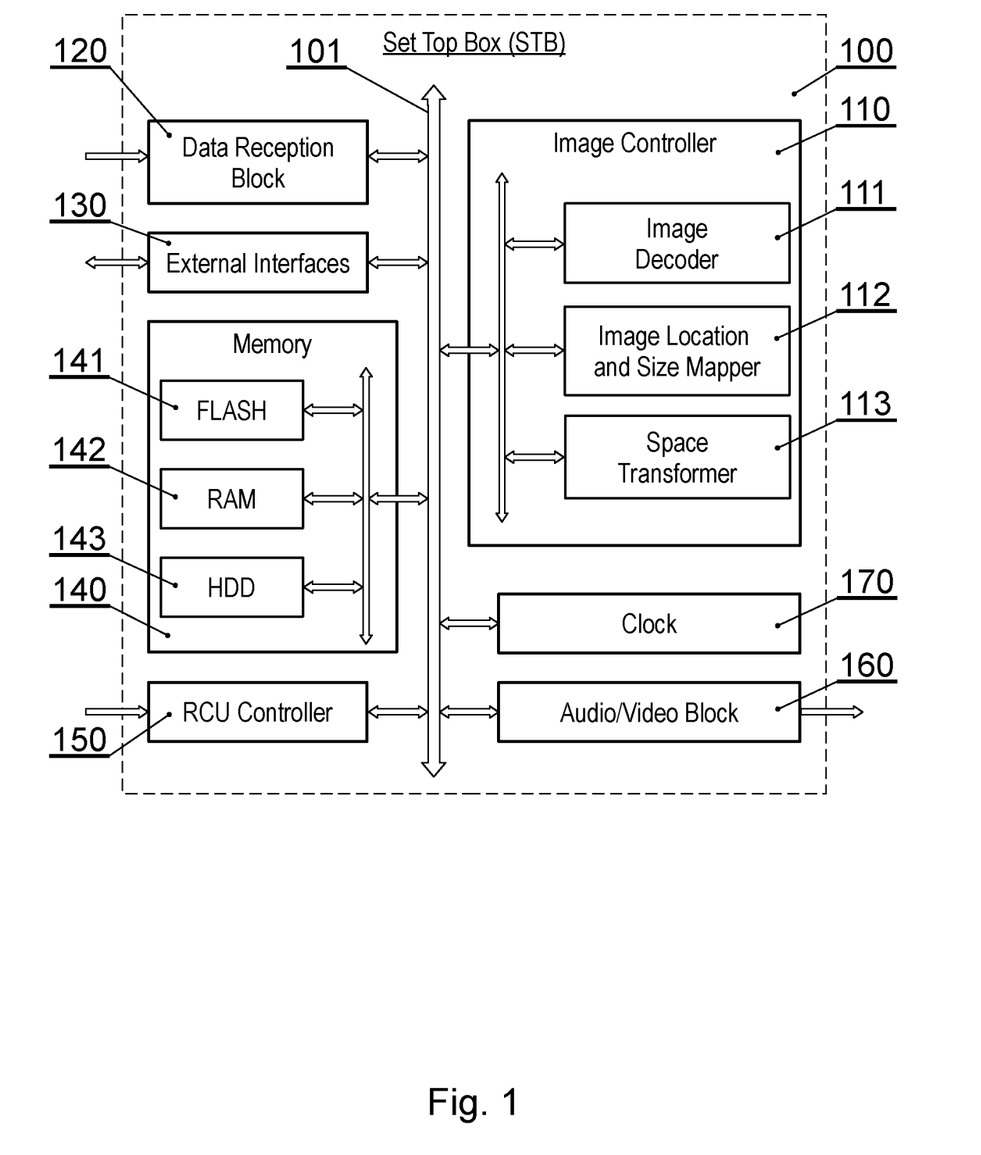
FIG. 1 presents a diagram of a receiver implementing a method according to the present invention.

FIG. 1 presents a diagram of an exemplary receiver (set-top box (STB)) implementing a method according to the present invention. To the left size of the bus (101) (may be any suitable data bus such as I2C) there are connected STB (100) components such as Data Reception Block (120) (audio/video and or supplementary data), External interfaces (130) (such as USB or Bluetooth), different kinds of memory (141, 142, 143), an RCU controller (150), Audio/Video Block (160) configured to process the received data and generate an output signal, a Clock (170). Other, common STB components may also be present such as an Ethernet port of Wi-Fi module.

To the right side of the bus (101) there is connected an Image Controller (110) and its subcomponents: an Image Decoder (111) configured to decode and decompress a surface (comprising images) into memory, an Image Mapper (113) configured to return an image location, width, height from respective mappings associated with a given image identifier and a Space Transformer (114) configured to convert between a one-dimensional space and a two-dimensional space as will be explained in the remainder of the specification.

The system may be realized using dedicated components or custom made FPGA or ASIC circuits. Other components of the system are communicatively coupled to the system bus 101 so that they may be managed by the Image controller 110 or a dedicated CPU (not shown).

The memories 141-143 may store computer program or programs executed by the Image controller 110 in order to execute steps of the method according to the present invention.

FIG. 2 depicts a method of packing images rectangles (201, 202, 203) into two-dimensional space (210), which is known from prior art and is presented for the purpose of comparison with the present invention. A side-effect of packing is an internal fragmentation (211).

Such two-dimensional space may be called a surface or a container and in principle is a rectangle i.e. a table of pixels having a given width (columns) and height (rows), for which memory space is allocated.

FIGS. 3A-B illustrate a method of packing image rectangles (201, 202, 203) into one-dimensional space (300, 301, 302) with the surface widths (201, 202, 203). The image also shows internal fragmentation when the surface width is not adjusted (311).

The term one-dimensional space means that an image is in principle a single line, which may be wrapped up depending on a width of a container (surface). Therefore, one dimension is considered.

In case of the width (201W) and the three images (201, 202, 203) the image A 201 fits without an offset since its real width equals the width of the container (300). In turn, the B 202 and C 203 images are offset because their real width differs from the width of the container (300) meant to store all three images A B C.

As soon as one image ends the next image starts, which usually creates an offset and disturbed images (when viewed unprocessed by a human eye) as shown in FIGS. 3A-B.

In FIG. 3A the container (300) has the same width (201W) as the image A (201), therefore the image A may be stored undisturbed even though it is already converted into a one-dimensional string of pixels. Image B (202) is then fit into the container (300) and naturally the height of the image B in the container (300) becomes less than its original height. Image C (203) is added in the same manner and ends at position (300A) thereby creating only very little internal fragmentation (less than one line of the container (300).

As shown in FIG. 3B when the container (301) has dimensions similar to dimensions of image B (202) the image B remains undisturbed (while a constant offset may be present) while the image A and C become disturbed when fit into said container (301).

In such case the image A (202) ends at location (303) and the image B ends at location (304) in the available width (202W) of the container (301).

When the container (302) has dimensions similar to dimensions of image C (203) the image C remains undisturbed (while a constant offset may be present) while the image A and B become disturbed when fit into said container (302).

In such case the image A (202) ends at location (306) and the image B ends at location (305) in the available width (203W) of the container (302).

Again, very little internal fragmentation (311) (less than one line of the container (302) is created.

FIG. 4A presents a surface subjected to a linear transformation where the surface width is optimized (401) (the optimization process will be presented with reference to the following figures) and internal fragmentation does not occur.

Figure 4B:
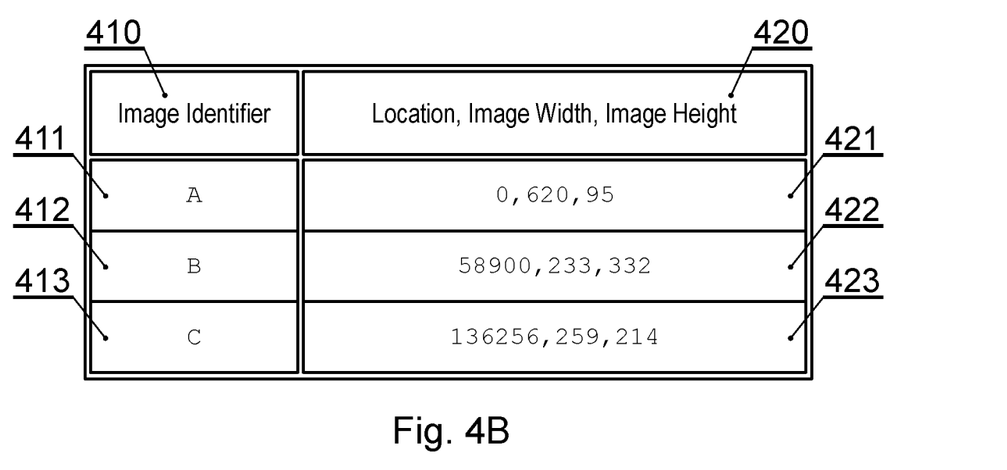
FIG. 4B depicts a mapping between image identifiers and its location in a surface, image width, image height.

FIG. 4B. depicts a mapping between image identifiers (411, 412, 413) and its location in a surface, image width, image height (421, 422, 423). As may be seen image A has 58900 pixels, image B has 77356 pixels while image C has 55426 pixels. Total number of pixels is 191682, which may be fit, without fragmentation and wasting of memory space, in a container of 463 by 414 pixels. Depending on memory availability this size may be changed while still maintaining zero wasted space i.e. a container of 207 by 926 pixels. This is because the 191682 has the following divisors 2, 3, 6, 9, 18, 23, 46, 69, 138, 207, 414, 463, 926, 1389, 2778, 4167, 8334, 10649, 21298, 31947, 63894 and 95841. Using one of those divisors as container's width or height results in zero wasted space (for images A B and C as shown) since these divisors divide 191682 without a remainder.

Figure 5:
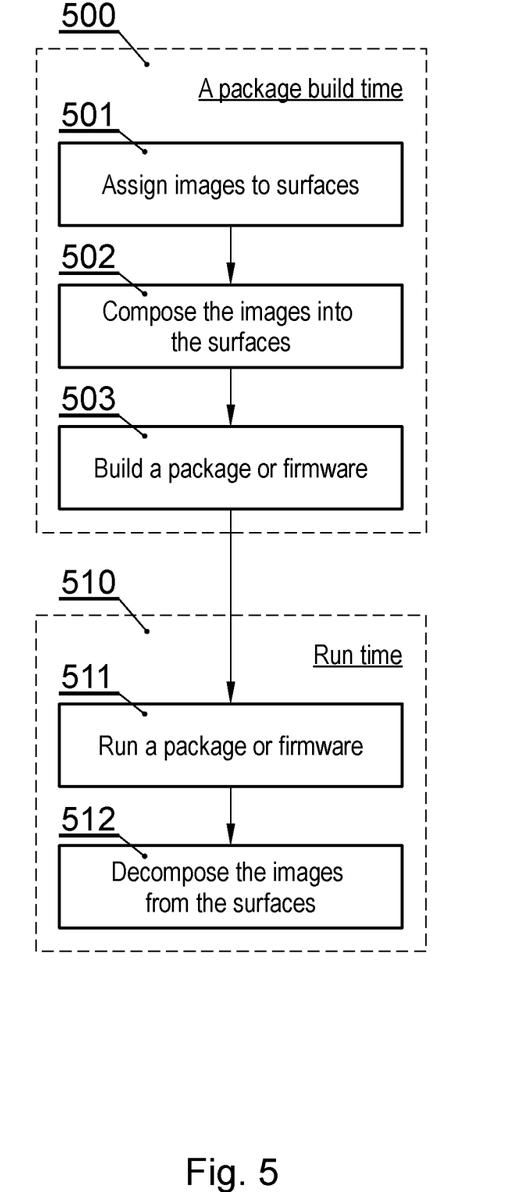
FIG. 5 shows a high level method according to the present invention.

In one embodiment of the present invention, the system presented in FIG. 1 is used according to the method shown in FIG. 5, which reduces fragmentation of graphical memory. The method comprises two process flows.

The first part of the process is dedicated to building and compressing a surface or a set of surfaces (501, 502). These steps are invoked before preparation of a software package or firmware (503), so the whole operation can be done during software preparation on a software building machine (the software package build time (500)).

This procedure comprises the following steps: Assigning images (501) to a surface (601-604) or a set of surfaces (611-616), then composing/fitting images (502) into the surfaces (701-706). The compressed surfaces are added as a resource to application's package or firmware (503). It is also possible to optionally leave the graphical data uncompressed.

Figure 6A:
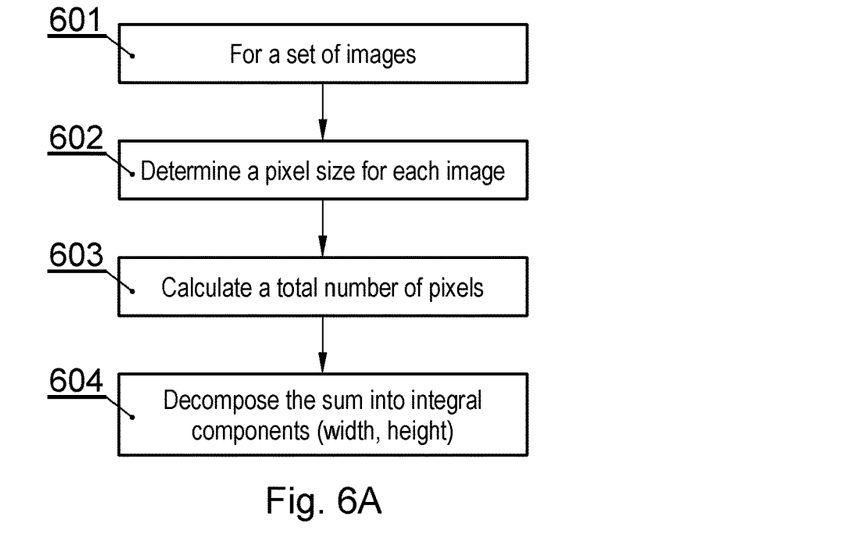
FIG. 6A shows a first method for finding the optimal width and height of a surface.
Figure 6B:
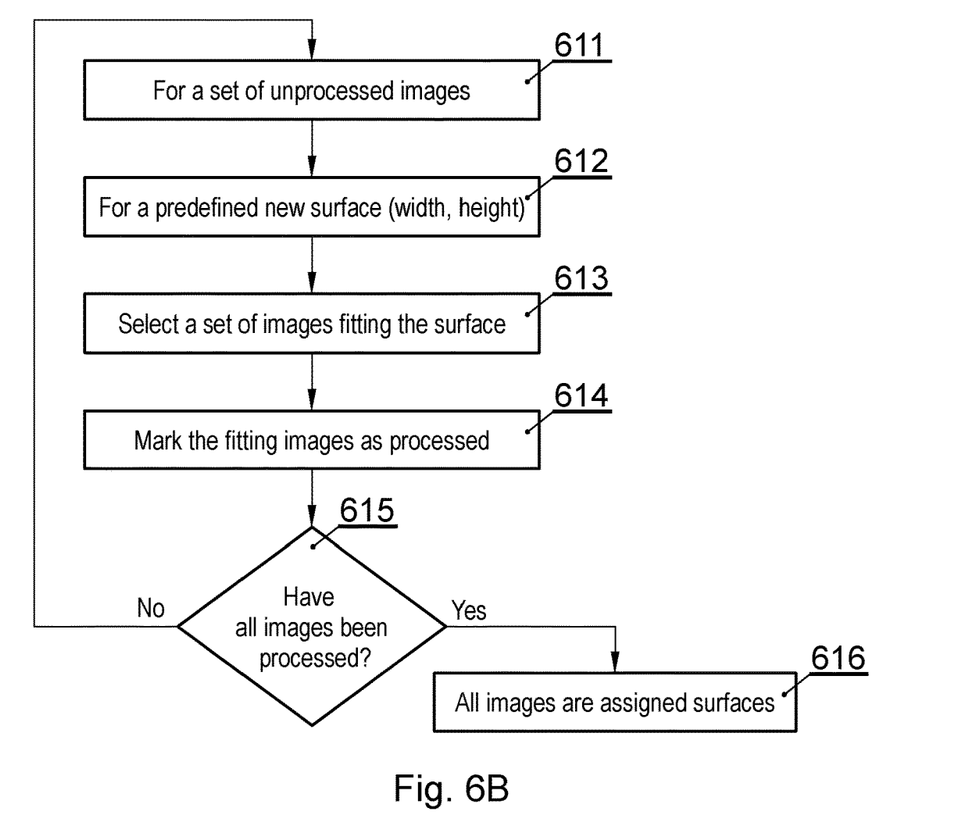
FIG. 6B shows a second method for finding the optimal match of images when considering a fixed width and height of a surface.

The step of assigning images to surfaces (501) depends on an optimal number of surfaces. If one surface is enough, its optimal width needs to be calculated. The method for finding the optimal width and height is depicted in FIGS. 6A-B. FIG. 6B applies when images do not fit into a single predefined surface.

Firstly, for each image in a set of images (601), a pixel image size is determined (602) by the formula:

$$size_i = width_i * height_i$$

then a minimal total number of pixels for the aggregated surface can be calculated (603) by:

$$S_{min} = \Sigma size_i$$

Then the $S=S_{min}$ is factorized into the surface's width and height. If the S cannot be factorized due to being a prime number or elements of factorization exceeds hardware constraints (e.g. minimum, maximum width or height decoded by hardware decoder) then the total number of pixels could be incremented (S=S+1). In the case of failure, the incrementation step could be repeated until the factors (width, height) will be found. One of the known methods of integer factorization can be used (e.g. Trial division).

Then the factors could be sorted the ascending order: $F_1$, $F_2$, $F_3$, ... $F_n$. The balanced width and height could be found by the following method:

$$width = F_1, height = F_n$$

and multiplying the factors $F_2$, ..., $F_{n-1}$ to the width or height depending on the lesser one:

if width<height then width=width*$F_i$ else
height=height*$F_i$

Figure 7A:
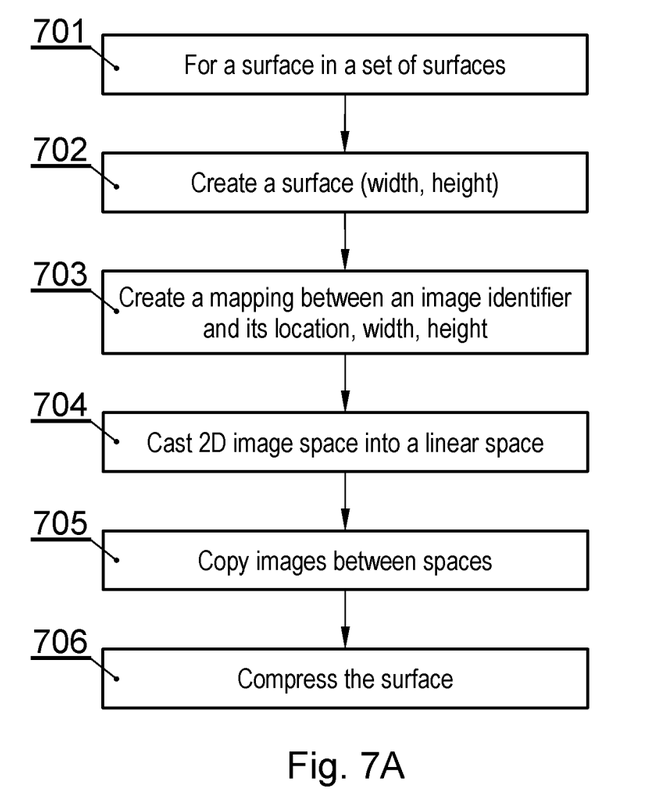
FIG. 7A shows a process responsible for packing images into a surface and compression of the surface.

In such a manner, the sum of pixels is decomposed (604) into integral components i.e. width and height of the container. The balanced width and height can be further used in the step of creating surfaces (702).

When one surface is not enough [e.g. width or height (determined according to 601-604) exceeded hardware decoder constraints], the images may be divided into separate sets and for each set the method presented in FIG. 6A (601-604) may be applied.

The other, alternative solution (611-616 of FIG. 6B) is to define the same surface size for every surface and divide images into groups. Setting the same surface size (e.g. a power of 2) facilitates an allocation process, because the surfaces can be replaced (e.g. a surface for a help menu can be replaced by a settings menu). A disadvantage of this method, when compared to the method presented on (601-604), is a larger internal fragmentation, and one of its benefits is easier memory management.

In particular, a subset from a set of unprocessed images (611) is selected to fit (613) the predefined surface width and height (612). After selecting and binding images to said surface, the images are marked as processed. If all images have been processed (615) the process of assigning images to surfaces is finished (616). Otherwise, the steps (611-614) are repeated for the rest of the unprocessed images.

Dynamic programming (it refers to simplifying a complicated problem by breaking it down into simpler subproblems in a recursive manner) may be applied to optimize a sum of surface's internal fragmentation and a satisfactory solution (613) could be found for a selection of images. Other approaches may include a Breadth-first search (BFS) method or a Depth-first search (DFS) method to find best fit of images into surfaces.

In a particular example, optimizing a sum of surface's internal fragmentation may be realized by a combination of both:
  Sorting images by their sizes;
  Putting images bigger than ½ of a surface into separate surfaces (the BFS step);
  Finding an optimal assignment of the rest of the images. Filling the first container by an optimal combination of images, and after that, the next containers from the combination of the remaining images (the DFS step).

A set of images could be too large to fit in one surface due to hardware constraints (exceeded maximum width, height that can be decompressed by a hardware or software Image Decoder (111)), or due to a design decision to place similar images together (e.g. a help menu is not called so often, so all the graphics in this menu could be moved to a surface and managed separately).

When all images have been assigned to at least one surface, the second part of the process of FIG. 5 is executed at a run time (510) on a device. The process (701-706) is responsible for decompressing and decomposition of images (512) from a surface or a set of surfaces. The compression/decompression part is considered optional.

For each surface (701) in a set of surfaces, a memory (width×height×pixel depth) is allocated (702) and the surface is created. A mapping between an image identifier and its location, width, height is created for each image associated with the surface (703). Then for each image according to its offset in the surface, 2D space of the image is cast (704) to one dimension according to the formula:

$$pi = yi*width + xi + location, \text{ where } i>=0 \text{ and } i<size \text{ of an image.}$$

where (xi, yi) is a location of image's pixels in two-dimensional space; pi is position in image's one-dimensional space; the location defines an offset of the image in surface's one-dimensional space; the image size is calculated by multiplication image's width and height from the previous mapping at step (420).

Knowing the transformation formula between spaces (one and two-dimensional) images can be copied into the destination surfaces (705). The surface or a set of surfaces, after the composition of the images into it, may be compressed (706) to reduce the size of a resource.

When a software package or firmware has been prepared (503), it can be run on a target machine (511). During starting of an application or later when an image is needed, the process of decomposing images from the respective surfaces is executed (512). The procedure comprises of the steps depicted in FIG. 7B.

Figure 7B:
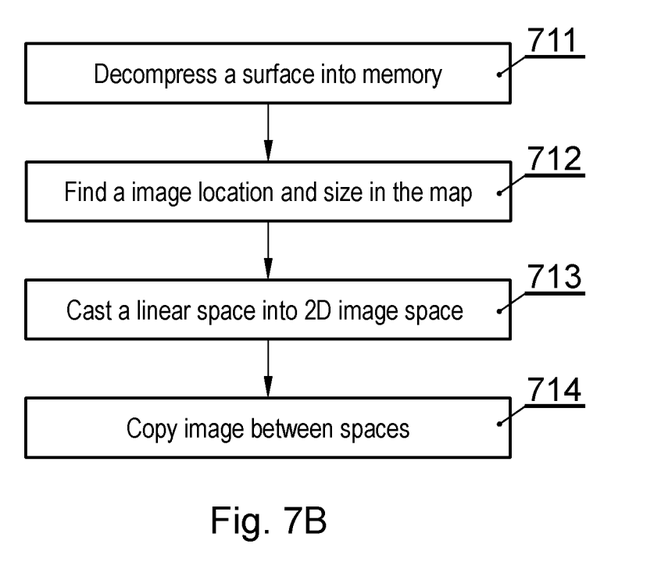
FIG. 7B shows a process of decomposing images from the respective surfaces.

As a first step (711), a surface is decoded and decompressed into memory (711) by the Image Decoder (111). This step could be skipped, when a surface has been decoded and decompressed and it is still accessible in the memory (for example the RAM (142)).

Then the Image Mapper (113) for a given image identifier (410) returns the image location, width, height (420) from mappings (e.g. 411-413 is mapped to 421-423). The next step is casting from the surface's linear space into 2D image space. The step is executed by Space Transformer (114) and realized by the following formulas:

$$x_{i\ mod\ width} = p_{location+i}$$

$$y_{i/width} = p_{location+i}, \text{ where } i >= 0 \text{ and } i < \text{size of an image.}$$

where ($x_{i\ mod\ width}$, $y_{i/width}$) is a place in image's 2D space for a pixel p located in surface's one-dimensional space ($p_{location+i}$); a location and width are taken from the mapping (420), they are associated to an image identifier; the mod is the modulo operation. The modulo and division operations are working on integer values and produce integer values as a result.

After casting operation, the image could be copied from one-dimensional space to 2-dimensional space (714).

In another embodiment of the present invention, the system presented in FIG. 1 can be used according to the method (FIG. 5) as a way of forming graphical caches. Surfaces prepared according to FIG. 6 and FIG. 7 (701-706) can form graphical caches.

The memory used for surfaces may be allocated at start-up or at demand. Dividing an application into logical partitions (e.g. channel banner, help menu, settings menu) and assigning to each partition a set of surfaces helps to define an amount of graphical memory needed for a particular partition. Some surfaces can be bound to many partitions. When a transition from one partition is requested to another one. The redundant surfaces can be unloaded and a requested partition could be loaded in the same memory location. The process of loading surfaces can be resolved by managing surfaces that sizes are constant or are rounded to a power of two.

In another embodiment of the invention, the system presented in FIG. 1 may merge the two flows: package build time (500) and run time (510) into just run time flow (510). In the case, the assigning of images (501) and composing the surfaces (502) are realized at run time e.g. (at application start-up or at demand). Due to all operations being executed at run time, the compression (706) and the decompression (711) of a surface could be reduced. Another solution is to prepare surfaces only once and store them compressed on a persistent storage. The surfaces can be reused instead of composing them from scratch during the next start-up of an application.

The main advantage of the invention is the reduction of internal and external fragmentation of graphical memory. The external fragmentation is reduced due to allocation of large memory areas and the internal fragmentation is reduced because an optimum size of images contained may even result in zero internal fragmentation.

The reduction decreases energy consumption and increases error resiliency. The second benefit of the solution is faster loading time of small graphics and more smooth usage of the memory in copy operations. The third asset of the invention is reusing already decompressed images as a cache. A process of loading an image into memory (decompression) could be skipped. The reduction safes a computation time and increases UI responsiveness. Therefore, the invention provides a useful, concrete and tangible result wherein further the machine or transformation test is fulfilled and the idea is not abstract since it has been put into practice and may be implemented according to the present specification.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for reducing memory fragmentation in a device lacking graphics memory management unit may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. Method for reducing memory fragmentation characterized in that it comprises the steps of:
for each image in a source set of images (601) determining image size (602) in pixels and obtaining (603) a minimal total number of pixels for an aggregated surface by obtaining a sum of image sizes;
factorizing (604) said sum of image sizes into a surface's width and height;
allocating memory (702) for said surface (701);
creating (703) a mapping between an image identifier and the image's location, width, height for each image associated with the surface;
for each image, according to the image's offset in the surface, the two-dimensional space of the image is cast (704) to one dimension according to the formula:

$$pi = yi * \text{width} + xi + \text{location}$$

where i>=0 and i<size of the image
where
(xi, yi) is a location of image's pixels in the two-dimensional space;
pi is position in image's one-dimensional space;
the location defines an offset of the image in the surface's one-dimensional space;
knowing the casting formula between said one and two-dimensional spaces, copying each image to the surface (705).

2. The method according to claim 1 wherein said factorizing (604) is executed by applying a trial division method.

3. The method according to claim 1 wherein a most balanced width and height are selected from the output of the factorizing step (604).

4. The method according to claim 1 wherein the surface is further compressed (706) to reduce the image's size.

5. The method according to claim 1 wherein said source set of images (601) is fitted into a plurality of surfaces.

6. A computer program comprising program code means embodied on a non-transitory medium for performing all the steps of the computer-implemented method according to claim 1 when said program code means is run on a computer.

7. System for reducing memory fragmentation characterized in that it comprises an Image Controller (110) comprising:
an Image Decoder (111) configured to decode and decompress a surface comprising images into a Memory (140);
an Image Mapper (113) configured to return an image location, width, height from respective mappings associated with a given image identifier; and
a Space Transformer (114) configured to convert between a one-dimensional space and a two-dimensional space;
wherein said Image Controller (110) is configured to execute all steps of the method according to claim 1.

8. Method for reducing memory fragmentation characterized in that it comprises steps of:
for each image in a source set of images (601) determining image size (602) in pixels and obtaining (603) a minimal total number of pixels for an aggregated surface by obtaining a sum of image sizes;
factorizing (604) said sum of image sizes into a surface's width and height;
wherein when it is determined that said sum of image sizes cannot be factorized due to being a prime number or factorization exceeding hardware constraints, incrementing said total number of pixels until the width and height factors have been found;
creating (703) a mapping between an image identifier and the image's location, width, height for each image associated with the surface;
for each image according to the image's offset in the surface, the two-dimensional space of the image is cast (704) to on dimension according to the formula;

$$pi = yi * width + xi + location$$

where i>=0 and i<size of the image
where
(xi, yi) is a location of image's pixels in the two-dimensional space;
pi is position in image's one-dimensional space;
the location defines an offset of the image in the surface's one-dimensional space;
knowing the casting formula between said one and two-dimensional spaces, copying each image to the surface (705).

* * * * *